United States Patent [19]

Regipa

[11] Patent Number: 4,812,189

[45] Date of Patent: Mar. 14, 1989

[54] PROCESS FOR ASSEMBLING TWO FILMS, IN PARTICULAR FILMS OF A FEW MICRONS THICKNESS

[76] Inventor: Robert Regipa, 226 avenue Saint-Exupéry, Bâtiment Provence - 31400 Toulouse, France

[21] Appl. No.: 24,435

[22] Filed: Mar. 11, 1987

[30] Foreign Application Priority Data

Mar. 11, 1986 [FR] France .............................. 86 03553

[51] Int. Cl.⁴ ................................................ B31F 1/00
[52] U.S. Cl. ...................... 156/201; 156/204; 156/247; 156/304.3; 156/304.6
[58] Field of Search ............... 156/201, 545, 152, 203, 156/218, 308.4, 344, 249, 544, 204, 505, 157, 247, 304.3, 304.6; 244/31

[56] References Cited

U.S. PATENT DOCUMENTS

| | | | |
|---|---|---|---|
| 2,858,090 | 10/1958 | Winzen et al. | 244/31 |
| 2,960,282 | 11/1960 | Winzen | 244/31 |
| 3,063,889 | 11/1962 | Staff | 156/201 |
| 3,065,121 | 11/1962 | Andrews | 156/544 |
| 3,068,137 | 12/1962 | Seubert | 156/201 |
| 4,219,378 | 8/1980 | Marschke | 156/504 |
| 4,379,012 | 4/1983 | Heymanns | 156/249 |

*Primary Examiner*—Michael W. Ball
*Assistant Examiner*—David Herb
*Attorney, Agent, or Firm*—Harold H. Dutton, Jr.

[57] ABSTRACT

The invention relates to a process for joining films by heat sealing, where these films are in rolls (9) and in particular a few microns thick. In a first stage, this process consists in spreading out a first film (1) on an assembly table (5) while hemming one of its longitudinal edges with a junction tape (3) and a positioning tape (4) sealed on that side of the junction tape (4) which is opposite the film. Once the desired film length has been reached, the film is transversely cut off and the positioning tape (4) then is used to handle this first film (1) and to assure its alignment with a segment of the film (2) packed on the roll (9). The second joining stage then consists in spreading out the film (2) on the table (5) while sealing a longitudinal edge of said film (2) to the outer side of the junction tape (3) following separation of the positioning tape (4) from this junction tape (3).

7 Claims, 4 Drawing Sheets

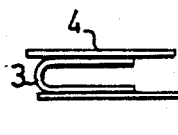
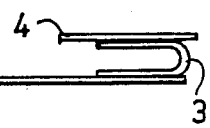
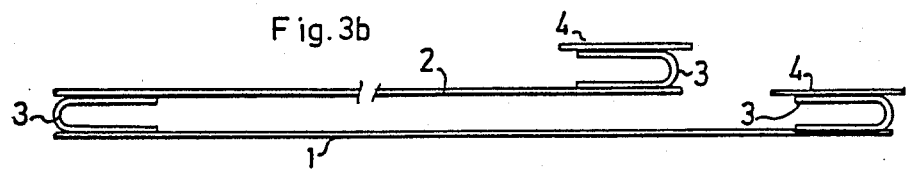
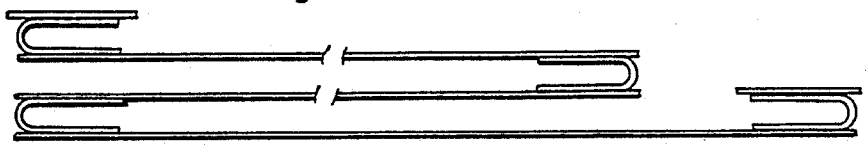
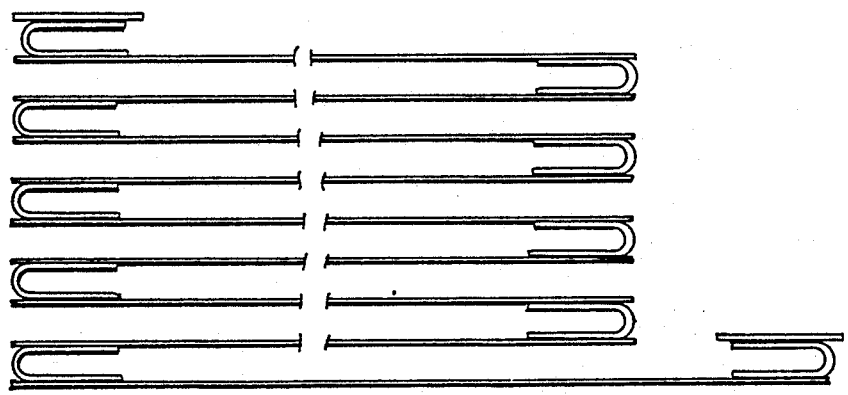
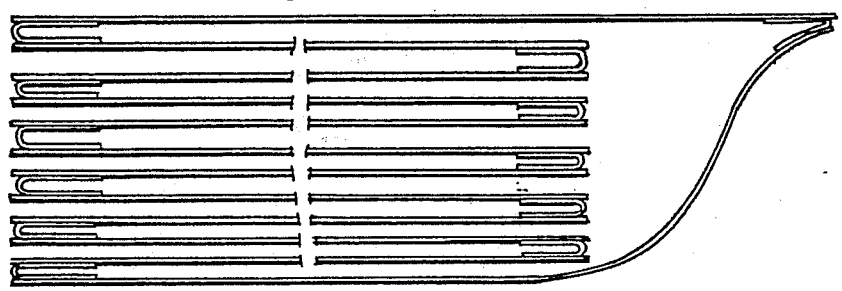

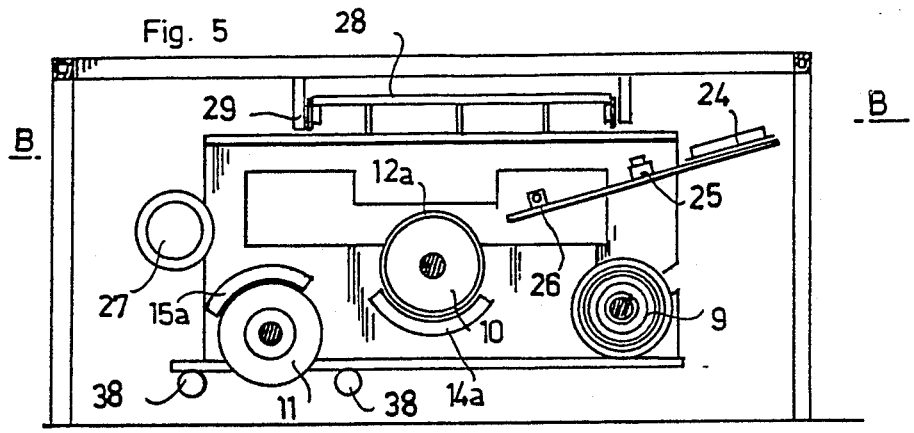
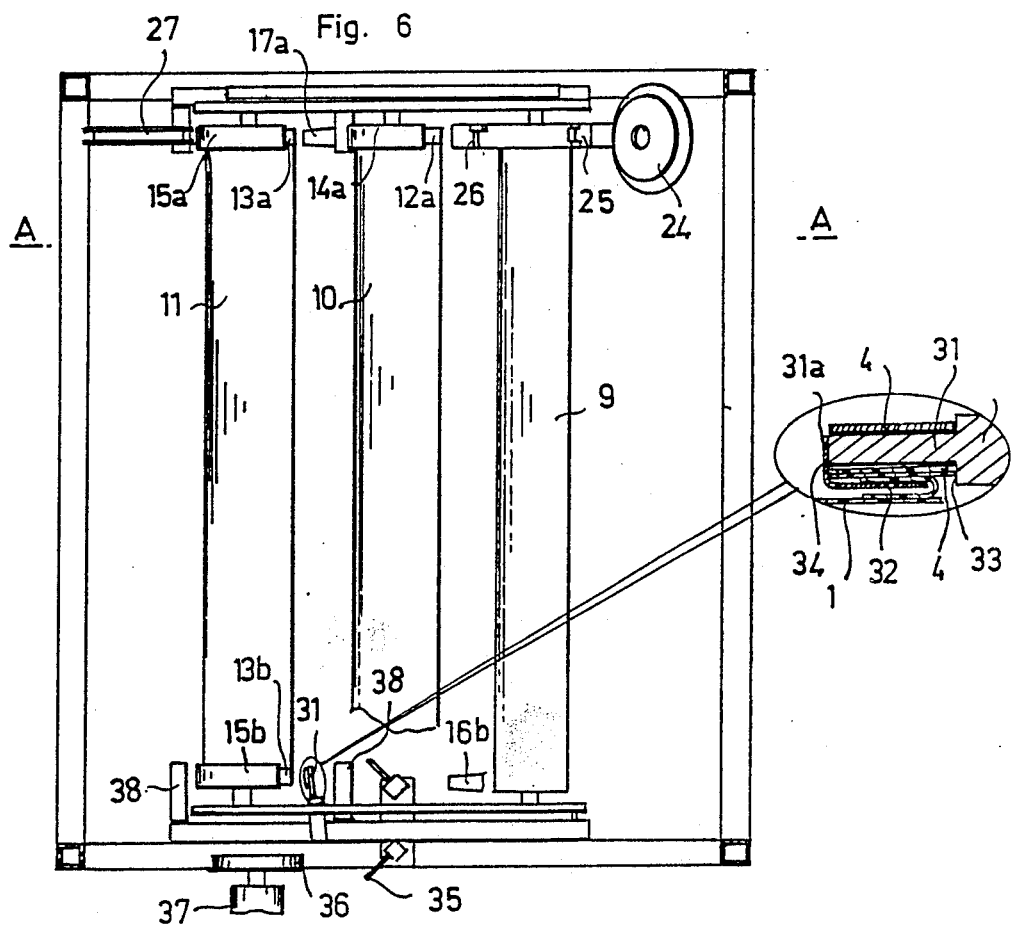

PROCESS FOR ASSEMBLING TWO FILMS, IN PARTICULAR FILMS OF A FEW MICRONS THICKNESS

This invention relates to a process for assembling two films, particularly films of several microns thickness. This invention also relates to an apparatus for assembling two films using this method.

BACKGROUND AND OBJECTS OF THE INVENTION

Various methods are known in the prior art for assembling films. These methods allow longitudinally joining films with thicknesses from a few tens to several hundreds of microns, the junction being in some cases reinforced by a longitudinal reinforcing band. Among the known methods are such techniques as flat-welding, called "peeling", where the two films are placed one on the other, with the edges to be joined in alignment. A reinforcing strip, which may be planar or comprise a folded ribbon, furthermore may be assembled together with the two films.

Another known method comprises placing the films edge against edge and joining them by a flat-laid cover tape straddling both films. All these methods enable, with more or less difficulty, joining films with minimum thicknesses of about 15 microns in the case of polyethylene films. However these known methods do not permit joining thinner films and in particular, thin polyester films. Handling these very thin films and joining them are exceedingly delicate operations, in which the slightest onset of tearing could possibly result in total film degradation. All these methods, which require handling of the film at a time when it is still unprotected, therefore do not assure a high-grade joining or assembling of the films.

On the other hand there is significant interest in polyester films because of their high strengths. At a given thickness, a polyester film is ten times stronger than a polyethylene film. This fact takes on great significance in the field of space balloons where the optimal trade-off between strength and weight is sought in order to move the largest possible load to the greatest possible altitudes. For strength reasons, the use of polyethylene prevents use of too thin films (less than 15 microns) because their low circumferential strength could cause the ruining of such balloons in spite of the balloons assuming a natural shape without circumferential stresses—at least under static conditions. It has been observed in practice, however, that there are dynamic forces which create significant circumferential forces.

As a result, present-day balloons illustratively may carry a load 500 kg to an altitude of only 45 km, the dead weight of this envelope being about 1,000 kg. Under the same conditions, an ultra-thin polyester balloon with a dead weight of 350 kg might carry that same load to a 55 km altitude.

Accordingly a primary object of the present invention is to overcome the disadvantages of the prior art methods.

Another object of the invention is to provide a process for joining thin films made of a material such as polyester having a minimum thickness of between 3 and 5 microns, without a danger of starting a tear.

Still another object of the invention is to create an envelope of a space balloon which is made of 3 to 5 microns thick polyester.

DESCRIPTION OF THE INVENTION

To that end the process of the invention for joining two films by heat-sealing, where these films in particular are a few microns thick, is of the type wherein two films are placed with their plane surfaces facing each other, the edges to be joined being in substantial alignment, and where a longitudinal joining band for effecting the junction is inserted between the films.

In the present invention, this process comprises causing a first film to be laid out in a longitudinal direction while hemming a longitudinal edge of the film with a junction tape, fastening a planar tape, called the positioning tape, on that side of the junction tape which faces the first film, using the positioning tape to handle the first film and to aligned the hemmed longitudinal edge so as to be opposite a longitudinal edge of the second film, moving the second film so it preads out in its longitudinal direction while progressively separating the planar positioning tape from the junction tape sealed on the first film during the spreading-out step, and in a second stage joining the longitudinal edge of the second film to the outside of the junction tape so released.

In this manner the first film is directly hemmed when it is spread out on an assembly table. Aside from the longitudinal end that will be fixed on the assembly table and then cut off, as will be seen further below, the entirety of the film therefore is immediately protected against any tear initiation.

When protected in this manner, the film can be handled by using the positioning tape for gripping the film. This tape then is used to align the edge to be joined of the film so hemmed with the edge to be joined of the second film. Next, the tw films are joined when the second film is spread out in the horizontal plane, which is made possible by the separation between the positioning and junction tapes. The junction zone which is longitudinally reinforced by the junction tape thereupon is assured against any risk of degradation of the assembly.

As a rule the junction tape is folded on itself about a longitudinal folding axis, and in this folded position has two mutually opposite inner sides that do not adhere to each other and two opposite outer sides which may adhere to the films to be joined and to the planar positioning tape.

This folded junction tape allows placing the films one on the other while achieving an assembly that will not tend to rip off, as would be the case if an unfolded junction tape were used. Moreover, in the course of making an envelope and after the joined films are spread out, the junction tapes form flat-sealed reinforcing bands that do not project from the envelope and which can withstand stresses in any direction.

In a preferred embodiment, the positioning tape is made of the same material as the junction tape, and the joining procedure comprises heating a segment of film and of junction tape to a specific temperature whereby they can be joined, and partially cooling the segment so assembled before assembly with the positioning tape in order to achieve simple coupling between the junction tape and the planar positioning tape.

This embodiment, then, permits easily separating the positioning tape from the junction tape without risk of degrading the initial assembly of the junction tape to the film.

In particular this process can be advantageously employed to join polyester films. The folded junction tape then is made of polyester, its outer sides being covered with a resin thermally reactivated at a temperature lower than the melting point of the polyester. The positioning tape also is made of polyester.

Due to this process, the thicknesses of the films to be joined can be reduced to magnitudes between 3 and 5 microns. In such case the junction tape preferably will be between 10 and 15 microns thick, thereby achieving a reinforced assembly. With regard to the positioning tape, its thickness is about a few tens of microns whereby it has enough rigidity to reliably position the film to be joined, as will be discussed further below. Again, the thermally reactivated resin preferably will be a polyester resin.

One of the applications of this process is the manufacture of envelopes from longitudinal gores of shapes fitted to the envelope of a balloon to be made. In the present invention, the process for joining two gores comprises the following steps: spreading out a first gore on a longitudinal support and hemming at least one of its longitudinal edges with a junction tape and a positioning tape, spreading out a second gore on the longitudinal support with one of its edges aligned with an edge of the first gore and in carrying out simultaneously with this spreading operation the joining of the above cited aligned edges of the first and second gores followed by separation of the positioning and of the junction tapes, hemming the other longitudinal edge of the second gore using a junction tape and a positioning tape.

After these elementary operations, the manufacture of the envelope will comprise the following steps: spreading out a gore while hemming its two longitudinal edges with a junction tape and a positioning tape, positioning one of the longitudinal edges of the gore by means of the planar positioning tape opposite an unhemmed, longitudinal edge of a second gore, spreading out the second gore, following separation of the positioning tape, by joining the mutually facing edges of the first and second gores and by simultaneously hemming the free edge of the second gore using a junction tape and a positioning tape, restarting this operation for all the gores less one which must be joined, detaching the free hemmed edges of the first and second gores and following separation of the junction tape joining the edges to a last unhemmed gore to be spread out.

This manufacturing process offers many advantages. First and foremost, it permits making an envelope on a single assembly table without having to touch the constituent gores except through the positioning tape. Furthermore the envelope so made is, at the end of manufacture, in the form of a folded sleeve with a width corresponding to that of one gore, so that no handling, with its attendant dangers of tearing, is required to fold this envelope.

The invention also includes apparatus for joining two films and includes an assembly table for spreading out the films, film supply means, reinforcing band supply means and a mobile unit which can move longitudinally above the assembly table and comprising on one hand positioning means for aligning the film edges to be joined with the reinforcing band, and heat-sealing means for the films and the reinforcing band.

Other features of the apparatus of the present invention comprise the reinforcing band supply means including means for feeding a junction tape and means for feeding a planar positioning tape; the heat sealing means which is designed to seal the junction tape to the longitudinal edge of a first film, seal the positioning tape or the longitudinal edge of a second film to the side of the junction tape facing the first film; positioning means comprising guide means for positioning in the same alignment a longitudinal edge of the first film, the junction tape and the positioning tape; means for positioning the positioning tape that are designed to position in the same alignment the longitudinal edge of the first film hemmed by the junction tape and the positioning tape, with an edge of the second film to be joined; means for separating the positioning tape and the junction tape are mounted on the movable unit to separate the junction and positioning tapes so as to permit joining the edges of the two films aligned by the positioning means of the positioning tape.

DESCRIPTION OF THE DRAWINGS

Other features and advantages of the invention will become clear with reference to the detailed description below with respect to the accompanying drawings which show, in illustrative and non-restrictive manner, one preferred embodiment, these drawings being an integral part of the present specification.

FIGS. 3a, 3b, 3c, 3d, 3e are schematic views illustrating the making of an envelope by a process of the invention, FIG. 5 is a vertical sectional view along lines AA of FIG. 6, and FIG. 6 is a horizontal sectional view along lines BB of FIG. 5.

DESCRIPTION OF PREFERRED EMBODIMENTS

To simplify the description, the terms upstream and downstream will be used in the direction of displacement of the movable unit.

Figure 4:
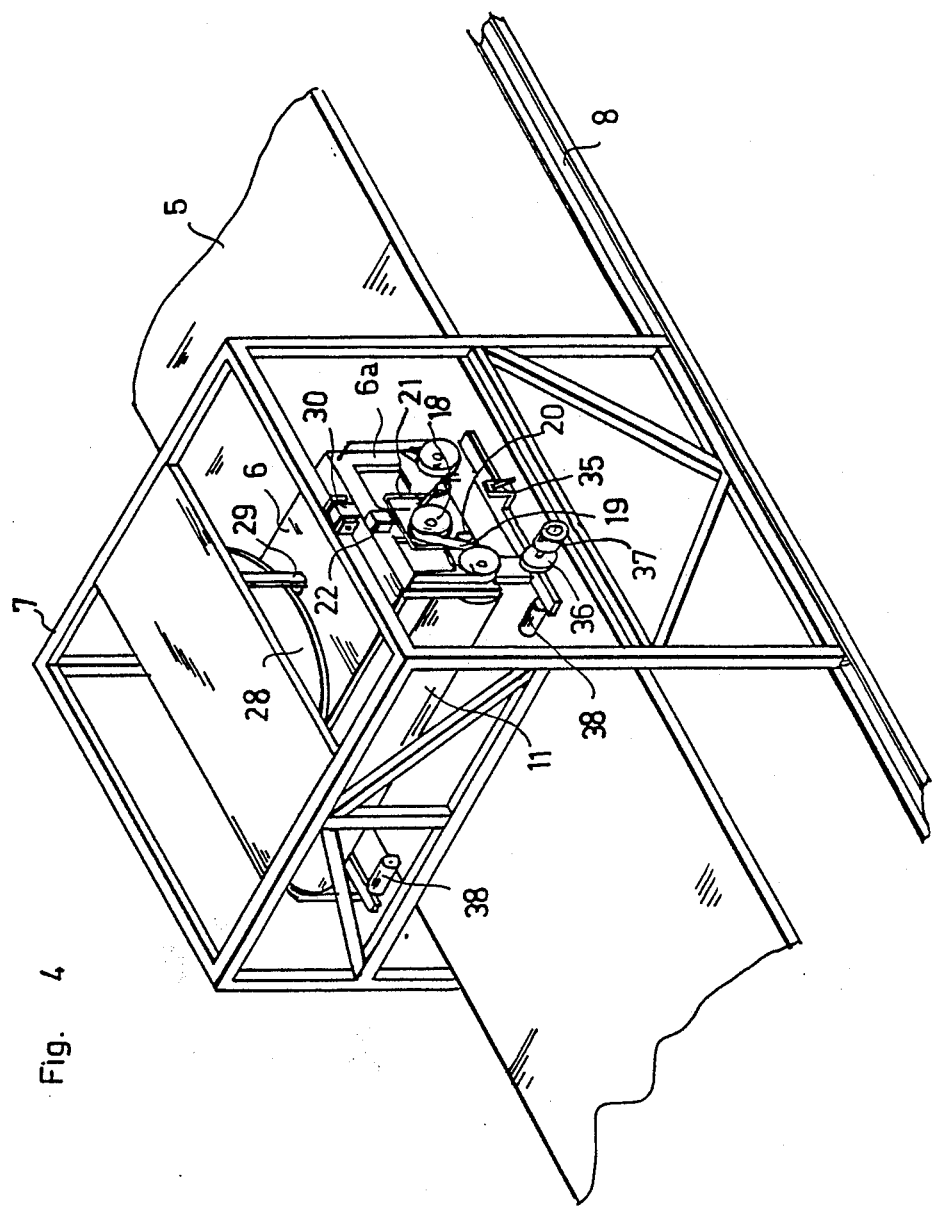
FIG. 4 is a perspective view of an apparatus for joining two films in accordance with the invention, from which certain protective casings are omitted for clarity.

The joining apparatus shown in FIGS. 4, 5 and 6 is used for joining by heat-sealing polyester films of which the minimum thickness may be between 3 and 5 microns. This apparatus is used in particular to make a cylindrical envelope, particularly for space balloons, that are built up from longitudinal polyester gores, as are described in French patent No. 80.00343.

This apparatus includes an assembly table 5 for spreading out the films and a frame 7 movable relative to this table. This frame is guided on two parallel rails 8 located on opposite sides of the assembly table 5 so as to allow it to be longitudinally moved with respect to the table 5.

Above the assembly table 5, the frame 7 supports a compact unit 6 comprising two lateral parallel sides 6a between which are arranged two cylinders 10, 11 and a roll 9 on which the film is packed. The axes of these cylinders 10, 11 and of this roll 9 are mutually parallel and perpendicular to the direction of motion of the movable unit.

The roll 9 is located downstream of the two cylinders 10, 11. In turn these two cylinders 10, 11 are located at different levels above the assembly table 5 and constitute guides between which the film is caused to pass so it will be in areal contact with both cylinders when being spread out on the table.

Preferably these two cylinders 10, 11 are made of aluminum, each being provided with two aluminum rings 12a, 12b, 13a, 13b which are spaced apart by a distance equivalent to the film width and which are insulated by a thermal insulator from the peripheral wall of these cylinders. An annular oven 14a, 14b, 15a, 15b is located in front of each of these rings, comprising a first portion parallel to the peripheral wall of the cylinders 10, 11 and extending over an arc of circle substantially equivalent to that cylinder zone which is out of contact with the film when this film is spread out.

These annular ovens 14, 15 also include a vertical return means in the form of a crown parallel to the longitudinal end of the cylinders 10, 11.

These annular ovens 14, 15 are supplied with hot air and are located in the immediate vicinity of the cylinders 10, 11 so that the temperature of the rings 12, 13 is uniform and independent of outside temperature variations. Moreover, the hot air temperature is regulated as a function of the temperature inside the ovens 14, 15 so as to achieve a temperature lower than the film-joining temperature.

The heating complement is carried out through heating nozzles 16a, 16b, 17a, 17b located opposite the rings 12, 13 and supplied with hot air from a branch on the supply line to the annular ovens 14, 15. The temperature difference between the air feeding the nozzles 16, 17 and the air feeding the ovens 14, 15 is achieved by placing an additional insulator on the branch feeding the nozzles.

The cylinders 10, 11 and the roll 9 furthermore are equipped with rotational locking means whereby in particular folds due to the inertia of the rotating cylinders may be avoided when the machine is being stopped. These locking means comprise three pulleys 18 each located in the extension of the shafts of the cylinders 10, 11 and of the roll 9. These three pulleys are connected by a belt 19 of which the two ends are fastened to one of the sides 6a of the movable unit 6.

These locking means also include two tail pulleys located below the belt 19 and symmetrically on both sides of the central cylinder 10. These two pulleys 20 are connected above this cylinder 10 by a rocking lever 21 opposite an electromagnet 22 that may displace it vertically. Energizing the eletromagnet 22 therefore applies a traction to the tail pulleys 20 and therefore tensions the belt 19 and locks the cylinders 10, 11 and the roller 9 in synchronized rotation.

The control for stopping the displacement of the frame 7 therefore is connected to a control for energizing the electromagnet 22. In order not to degrade the film portion in contact with the rings 12, 13 of the cylinders 10 and 11, simultaneously a signal will close an electric valve located in the air supply line of the heating nozzles 16, 17.

The compact unit 6 furthermore includes means 23 for feeding a polyester junction tape 3 of about 10-15 microns thickness and about 10 mm wide. This junction tape 3 is covered on one side with a thermally reactivated polyester resin effective at a temperature lower than the polyester melting point but higher than that delivered by the annular ovens 14, 15.

These tape supply means comprises two identical assemblies each located opposite a ring 12 of the central cylinder 10 and comprising a packing spool 24 on which is wound the junction tape 3. They are associated with a folding member 25 having a slit of which the dimensions are suitable to allow housing this junction tape in a position wherein it is folded on itself about a longitudinal axis. This spool 24 and the folding member 25 are arranged in such a manner that they will deliver the junction tape 3, which is folded parallel to the frame direction of motion, aligned with a ring 12a, 12b of the central cylinder 10. In order to adjust this transverse position of the tape 3, the supply means also includes a guide finger 26 located near each ring 12a, 12b.

Lastly the compact assembly 5 comprises means 27 for feeding a planar polyester tape 4 about 50 microns thick and 3-4 cm wide. This supply means includes two identical spools 27 each located upstream of and above a ring 13 of the third cylinder 11 (upstream cylinder). This spool 27 is positioned in such a manner that the planar tape 4 will be delivered parallel to the frame direction of motion and aligned with a ring 13a, 13b of this third cylinder.

Figure 1:
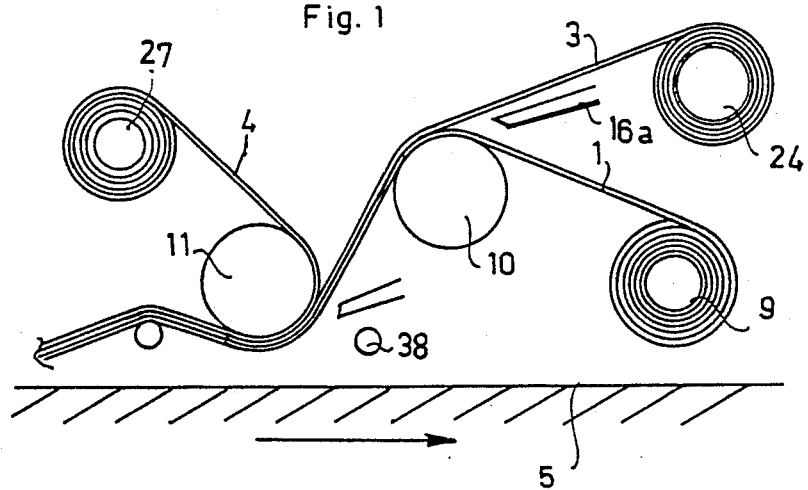
FIGS. 1 and 2 are schematic sectional views illustrating two consecutive stages in joining two films by a process of the invention.

The above described diverse supply, guide and heat-sealing means make it possible, in a first stage, to assemble the folded junction tape 3 to a film longitudinal edge and, in a second stage, to join the positioning tape 4 to the other side of the junction tape 3 as shown in FIG. 1.

Initially the film 1 and the junction tape 3 are spread out in order to be fastened on the end of the assembly table 5. Accordingly, when the frame 7 is moved, this film and this tape are kept tensioned between the end of the table on the one hand and on the other the roll 9 and the spool 24 respectively.

In the course of this initial spreading-out operation, this film 1 and this tape 3 are guided between the cylinders 10 and 11 so as to be respectively in contact with part of the peripheral wall of each of these cylinders.

Downstream, fasteners allow keeping the film on the end of the table 5, the film then being protected manually and transversely by a reinforcing adhesive band whereby any start-up tears can be stopped. This adhesive band thereby defines the longitudinal gore end, the film portion upstream of this band subsequently being cut off and discarded.

The positioning tape 4 also is unwound so as to be wrapped by half a revolution on the cylinder 11 and then be fastened to the end of the table.

After these preliminary operations, the movable frame 7 is moved longitudinally along the assembly table 5, thereby causing the film 1 to be spread out on that table.

While this motion is taking place, an annular oven 14a (or 14b) of the cylinder 10 raises a longitudinal edge of the film 1 to a temperature slightly below the reactivation temperature of the resin of the junction tape 3. The heat input making possible this reactivation is introduced through the nozzle 16a (or 16b), whereby an improved junction is assured because the position of the nozzle allows direct heating of the surfaces to be joined.

The assembly of film and junction tape obtained in this manner then cools, in part by convection, while traveling between the two cylinders 10 and 11. The annular ovens 15 associated with this cylinder 11 not being supplied with hot air, the positioning tape 4 then is sealed on the junction tape 3 at an intensity less than that used in bonding the film 1 to the junction tape 3. Subsequently it will be possible because of this step to easily withdraw this positioning tape, as described further below.

When the frame 7 arrives at the opposite end of the assembly table 5, the diverse tapes, bands and films are prepared for another pass. To enable the return trip, the compact unit 6 is fastened to the frame 7 by rotational drive means 28, 29 designed to allow rotating of this unit by 180°. This drive means comprises a horizontal wheel 28 above the compact unit 6 and rollers 29 solidly fixed to the frame 7 and supporting the wheel 28 so as to guide it in rotation. The frame also includes two locking members 30 located in such a manner as to set the compact unit 6 into either one of its operational positions.

The second joining stage comprises assembling the film 1 spread out on the table and hemmed as described above to a film segment obtained by unwinding the parked roller 9. To enable this assmbly, the compact unit 6 comprises positioning means for the hemmed film and separation means for separating the positioning tape 4 from the junction tape 3.

The positioning means is designed to properly align the hemmed edge of the film 1 spread out on the assembly table 5 with the edge to be joined of the film 2 packed on roll 9.

To that end this positioning means includes a stud 31 arranged perpendicularly to the direction of motion of the frame and opposite the ring 13b of cylinder 11. The end 31a of this stud 31 holds an L-shaped needle 32, the horizontal arm of this needle being parallel to the stud axis and below this stud. This stud 31 also is provided with a shoulder 33 parallel to the vertical arm 34 of the needle 31 so that these two elements determine two mutually opposite guide surfaces 33, 34 which are spaced apart by a distance equivalent to the width of the positioning tape 4.

As the position of the stud 31 is easily adjusted, it is also possible by placing the positioning tape 4 in the gap between the two guide surfaces 33, 34, and, due to horizontal part of the needle 32 being inserted into the fold of the junction tape 3, to precisely position the film 1 spread out on the table to be accurately opposite the second film 2 to be joined.

The means for separating the positioning tape 4 from the junction tape 3 besides the stud 31 also include return means comprising two guide fingers 35 downstream of the stud 31 together with their shafts which are oblique to the direction of motion of the frame 7 and essentially defining a right angle.

In this manner the positioning tape 4 can be placed in the gap defined by the guide surfaces 33, 34 and then be wrapped by half a revolution around the stud 31 and lastly be arranged around each guide finger 24 so as to be returned toward the end of the assembly table 5 upstream of the frame 7. When the frame is displaced, this tape 4 therefore will be separated from the junction tape 3, the more easily that these tapes are merely coupled together.

In another preferred embodiment, this tape 4 can be rewound on a take-up spool 36 mounted on the compact unit 6 and rotationally driven by a drive means actuated by a torque-regulated motor 37. This take-up spool 36 offers the advantage of being recoverable and being subsequently used as the supply spool 27, which avoids having to fasten the positioning tape at the end of the table. For reasons of compactness, this take-up spool 36 also shall be used in combination with the above cited guide fingers 35.

Because the two films 1, 2 are joined when coming into contact with the ring 13b of the cylinder 11, the compact unit 6 is provided on both sides of this cylinder with one support cylinder 38 located at a height above the assembly table which slightly exceeds the lower generatrix of the cylinder 11.

These two support cylinders 38 holding the hemmed edge of the film 1 spread out on the assembly table 5 therefore permit achieving a sufficient contact area between the ring 13b and the film segment to be joined.

Figure 2:
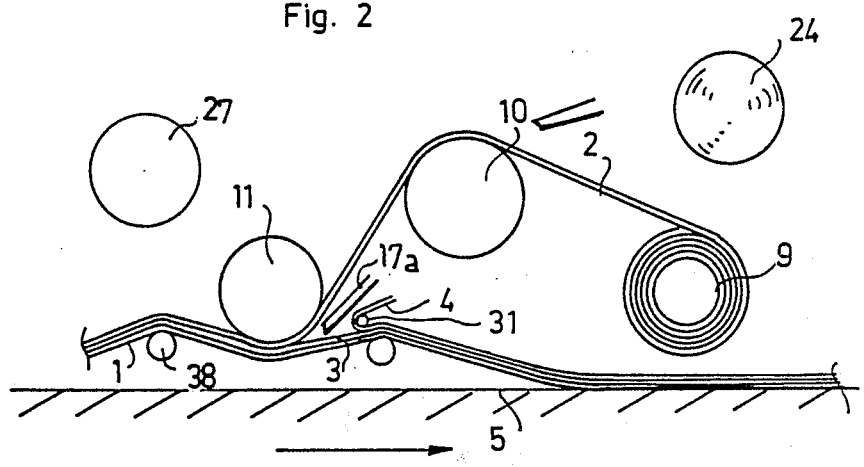

The manner in which the joining proper of the films 1, 2 is carried out is illustrated in FIG. 2. During this joining, only one annular oven 15b associated with the cylinder 11 is supplied with hot air so as to raise the film and the junction tape 3 to a temperature slightly less than the reactivation temperature of the resin of this junction tape 3. The heat input takes place through a hot-air nozzle 17b which furthermore allows better heating of the surfaces to be joined.

The preliminary operations of this second joining stage comprise in spreading out the film 2 packed on the roll 9 between the cylinders 10, and 11, and then fastening it to the end of the assembly table to keep it taut while being spread out. A segment of the film 1 spread out on table 5 is placed on the guide cylinders 38 and its positioning tape 4 is placed in the guidance gap 33, 34, its end being wound on the takeup spool 36.

Accordingly, when the frame 7 is being moved, the positioning tape 4 in a first phase assures that the film 1 spread out on the assembly table 5 opposite the film 2 be kept tensioned between the end of the table and the packed roll 9, and in a second phase will be separated from the junction tape 3 so as to make possible the assembly of this junction tape 3 to the film 2.

In the course of these phases, therefore, none of the two films will be directly handled by an operator and perfection junction shall be assured.

The two consecutive stages illustrated in FIGS. 1 and 2 and allowing to join two films may be repeated so as to make an envelope, in particular for a space balloon, by means of consecutive operations.

The manufacture of such an envelope requires several consecutive operations described below in relation to FIGS. 3a through 3e.

The first operation comprises in fastening one end of the film packed on the roll 9 to the assembly table 5 and to do the same for the ends of the junction tape 3 and the positioning tape 4.

It should be noted that these different steps must be carried out in a predetermined sequence to allow positioning the junction tape 3 between the film and the positioning tape 4 at the cylinder 11.

The frame 7 holding the compact unit 6 next is driven in the longitudinal direction above the assembly table 5, only the two annular ovens 14a, 14b of the central cylinder 10 and the associated nozzles being supplied with hot air. During this motion, the rolls 9 and the spools 24, 27 are made to unwind, causing thereby the fastening of a hem strip comprising of a junction tape 3 and of a positioning tape 4 on each longitudinal film edge (FIG. 3a).

When the movable frame 7 arrives at the end of the assembly table 5, the film and the two junction tapes 3 on its edges are cut and next fixed on this assembly table after the movable unit 6 has been moved by 180°. Similarly, the end of the film packed on the roll in turn is fastened to the assembly table.

A segment of one of the longitudinal edges of the film 1 spread out on the table during the first pass next is placed on the support cylinders 38, its positioning tape 4 being emplaced between the guide surfaces 33, 34 and the end of this tape 4 being wound on the takeup spool 36. In this position this longitudinal edge is aligned with one of the longitudinal edges of this film 2 packed on the roll 9. The opposite longitudinal edge of this film 2 is prepared in the manner described above to allow reinforcing it with a junction tape and a positioning tape.

The second operation then comprises moving the frame 7, one of the annular ovens 15b of the cylinder 11 and the associated nozzle being supplied with hot air to allow joining the mutually opposite edges of the films 1 and 2. On the other side however, only the annular oven 14a of the cylinder 10 and the associated nozzle are supplied with hot air to allow hemming the second longitudinal edge of film 2.

Therefore, on the second pass, one of the longitudinal edges of the film 2 spread out on the table is joined to the film 1 previously unwound on table 5 while the opposite longitudinal edge of this film 2 is hemmed by tapes 3 and 4 (FIG. 3b).

Thereupon and in the same manner, a given number of passes can be carried out to join in the same manner all, less one, of the gores of the envelope.

In order to seal the envelope, the last operation comprises clearing the free and hemmed longitudinal edges of the first and last gores and placing them in position on the support cylinders 38, while their respective positioning tape 4 is emplaced between the guide surfaces 33, 34.

Then, the frame is actuated, only the two annular ovens 15a and 15b of the cylinder 11 and the associated nozzles being supplied with hot air. In this manner the joining of the two longitudinal edges of the film packed on the roll 9 are respectively joined to a longitudinal edge of the first and last gores.

It follows, therefore, that in the manufacture of the envelope, only the longitudinal ends of the various gores are subject to handling without having been previously protected. These ends aside, all the gores are joined without any film segment lacking a protective band ever being handled. Accordingly, if the precaution is taken to keep only a substantially shortened gore length, then this process, and the apparatus for carrying it out, allow making a very thin polyester envelope while being free from the danger of tearing it.

I claim:

1. A process for joining two films (1,2) of a few micron thickness by heat sealing comprising spreading a first of said films while affixing a juction tape (3) along one edge of said first film so that said junction tape (3) is affixed to said one edge of said first film, fastening a planar positioning tape (4) to said junction tape (3), using said positioning tape (4) to handle said first film for aligning said first film (1) with a first longitudinal edge of a second film (2), spreading said second film (2) in longitudinal edge alignment with said first film while gradually removing said positioning tape (4) from said junction tape(3), and heat sealing the longitudinal edge of said second film (2) to said junction tape (3).

2. A process as in claim 1 including using a positioning tape (4) made of the same material as the junction tape (3), heating a segment of the first film (1) and of the junction tape (3) to a given temperature for joining them, and partly cooling the segment so joined before joining to the positioning tape (4) so as to achieve a mere coupling state between said junction and said positioning tapes.

3. A process as in claim 1 wherein said films are films, comprising using a polyester folded junction tape (3) having outer sides covered with a resin that can be thermally reactivated at a temperature less than the polyester melting point, and having a polyester positioning tape (4).

4. A process as in claim 3 and wherein said films are polyester films substantially 3 to 5 microns thick, and said junction tape (3) is substantially 10 to 15 microns thick, the outer sides of which are covered with a thermally reactivating polyester resin and said positioning tape (4) is several tens of microns thick.

5. A process as in claim I and wherein said junction tape (3) comprises a tape having one non-adherent face and one adherent face and including folding said junction tape longitudinally with said non-adherent face internal to the fold, and affixing one portion of the adherent face of said junction tape to said first film and fastening said positioning tape to the other portion of the adherent face of said junction tape.

6. A process as in claim 1 and including repeating said process for joining a third film to the second longitudinal edge of said second film.

7. A process as in claim 6 and including affixing a second junction tape to the second edge of said first film and fastening a second postioning tape to said second junction tape, carrying out said repeating step so as to join a plurality of said films, sealing the last of said films to said second junction tape while removing said second positioning tape thereby forming an envelope of said films.

* * * * *